United States Patent
Oh et al.

(10) Patent No.: US 11,827,947 B2
(45) Date of Patent: Nov. 28, 2023

(54) HOT PRESS-FORMED MEMBER HAVING EXCELLENT CRACK PROPAGATION RESISTANCE AND DUCTILITY, AND METHOD FOR PRODUCING SAME

(71) Applicant: POSCO, Pohang-si (KR)

(72) Inventors: Jin-Keun Oh, Gwangyang-si (KR); Seong-Woo Kim, Gwangyang-si (KR); Yeol-Rae Cho, Gwangyang-si (KR); Won-Mo Bak, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 819 days.

(21) Appl. No.: 16/315,767

(22) PCT Filed: Jul. 7, 2017

(86) PCT No.: PCT/KR2017/007328
§ 371 (c)(1),
(2) Date: Jan. 7, 2019

(87) PCT Pub. No.: WO2018/009041
PCT Pub. Date: Jan. 11, 2018

(65) Prior Publication Data
US 2020/0010915 A1    Jan. 9, 2020

(30) Foreign Application Priority Data
Jul. 7, 2016   (KR) .................. 10-2016-0086248

(51) Int. Cl.
*C21D 8/02*    (2006.01)
*B21B 3/02*    (2006.01)
(Continued)

(52) U.S. Cl.
CPC .............. *C21D 8/0226* (2013.01); *B21B 3/02* (2013.01); *B21B 37/74* (2013.01); *C21D 8/0236* (2013.01);
(Continued)

(58) Field of Classification Search
None
See application file for complete search history.

(56) References Cited

U.S. PATENT DOCUMENTS 6,296,805 B1    10/2001 Laurent et al.
2013/0295402 A1 11/2013 Oh et al.
(Continued)

FOREIGN PATENT DOCUMENTS

JP    2010065293    3/2010
JP    2014019941    2/2014
(Continued)

OTHER PUBLICATIONS

European Search Report—European Application No. 17824596.5, dated May 13, 2019, citing WO 2016/063467, Fonstein, EP 2 946 848 and WO 2015/182591.
(Continued)

*Primary Examiner* — Brian D Walck
(74) *Attorney, Agent, or Firm* — CANTOR COLBURN LLP (57) ABSTRACT

Provided is a hot press-formed member having excellent crack propagation resistance and ductility. The hot press-formed member includes: a base steel sheet and a zinc or zinc alloy plating layer on at least one surface of the base steel sheet. The base steel sheet contains, by wt %, carbon (C): 0.08-0.30%, silicon (Si): 0.01-2.0%, manganese (Mn): 3.1-8.0%, aluminum (Al): 0.001-0.5%, phosphorus (P): 0.001-0.05%, sulfur (S): 0.0001-0.02%, nitrogen (N): 0.02% or less, and a balance of iron (Fe) and other impurities. The hot press-formed member comprises 1-30 area % of retained austenite as a microstructure, and a Mn(wt %)/Zn(wt %) content ratio in an oxide layer of 0.5-1.2 μm in a thickness direction from a surface layer of the plating layer is 0.1 or more.

4 Claims, 2 Drawing Sheets

(51) Int. Cl.
    *B21B 37/74*     (2006.01)
    *C21D 9/46*     (2006.01)
    *C22C 38/04*     (2006.01)
    *C22C 38/20*     (2006.01)
    *C22C 38/34*     (2006.01)
    *C22C 38/48*     (2006.01)

(52) U.S. Cl.
    CPC ............... *C21D 9/46* (2013.01); *C22C 38/04* (2013.01); *C22C 38/20* (2013.01); *C22C 38/34* (2013.01); *C22C 38/48* (2013.01); *B21B 2201/02* (2013.01); *C21D 2211/001* (2013.01); *C21D 2211/002* (2013.01); *C21D 2211/008* (2013.01)

(56) References Cited

U.S. PATENT DOCUMENTS

| | | |
|---|---|---|
| 2015/0047753 A1 | 2/2015 | Luther et al. |
| 2015/0284819 A1 | 10/2015 | Tamaki et al. |
| 2015/0354035 A1 | 12/2015 | Mizuta et al. |
| 2017/0306437 A1 | 10/2017 | Nakagawa et al. |

FOREIGN PATENT DOCUMENTS

| | | |
|---|---|---|
| JP | 2014156653 | 8/2014 |
| KR | 20120073407 | 7/2012 |
| KR | 20140035033 | 3/2014 |
| KR | 20140147107 | 12/2014 |
| KR | 20150029742 | 3/2015 |
| WO | 2015182591 | 12/2015 |
| WO | 2016063467 | 4/2016 |

OTHER PUBLICATIONS

Fonstein, Candidates for the Third Generation: Medium Mn Steels, Advanced High Strength Sheet Steels, 2015, pp. 297-325.

Abstract of Christien F., et al., A comparison of dilatometry and in-situ neutron diffraction in tracking bulk phase transformations in a martensitic stainless steel, Materials Characterization, May 2013, vol. 82, pp. 50-57.

European Search Report—European Application No. 17824596.5 dated Jan. 16, 2020, citing WO 2016/063467, EP 3181715, Fonstein, EP 2946848, and Christien F., et al.

International Search Report—PCT/KR2017/007328 dated Sep. 29, 2017.

HOT PRESS-FORMED MEMBER HAVING EXCELLENT CRACK PROPAGATION RESISTANCE AND DUCTILITY, AND METHOD FOR PRODUCING SAME

TECHNICAL FIELD

The present disclosure relates to a hot press-formed member suitable for use as an automotive material, and more specifically, to a hot press-formed member having excellent crack propagation resistance and ductility, and to a method for producing the same.

BACKGROUND ART

Recently, hot press-formed members have been widely used as automotive structural members for purposes such as reducing the weight of a vehicle and improving the fuel efficiency of a vehicle, and a great deal of research has been conducted for such purposes.

For example, the invention disclosed in Patent Document 1 may provide a member having an ultra-high strength in the range of 1,500 MPa or greater in tensile strength, by hot press forming and rapid cooling an aluminum-plated steel sheet after heating the same to 850° C. or higher. In addition, due to the formation of an Al—Fe alloy layer, a steel sheet having excellent corrosion resistance may be provided.

However, according to the patent document, the main phase of a coated steel sheet is formed by aluminum, so it may be difficult to exploit the sacrificial effects of aluminum, and ductility cannot be improved.

In this context, Patent Document 2 discloses a technique to effectively achieve the sacrificial effects of a hot press-formed member, the technique characterized in that after a Zn-plated steel material is heated at 880-980° C. for 6-15 minutes, a buffer layer is formed at boundaries between a base steel sheet and a plating layer.

However, in this case, as a heating temperature becomes 880° C. or greater, spot weldability deteriorates due to zinc oxides formed on a zinc surface, and ductility cannot be improved, and due to an inferior crack propagation resistance, it is difficult to control the depths of microcracks to be 10 μm or less.

For hot press-formed members to be suitable for use as impact-resistant members of vehicles, the hot press-formed members not only require ultra-high strength, but also need to have improved corrosion resistance and crack propagation resistance, as well as fatigue properties and crashworthiness, and therefore, it is necessary to develop a hot press-formed member that satisfies the aforementioned properties.

(Patent Document 1) U.S. Pat. No. 6,296,805
(Patent Document 2) Korean Laid-Open Patent Application No. 2014-0035033

DISCLOSURE

Technical Problem

An aspect of the present disclosure is to provide a hot press-formed member having excellent crack propagation resistance and ductility, which may be suitably used for automotive structural members or reinforcing materials that require corrosion resistance and crashworthiness, and a method for producing the same.

Technical Solution

An aspect of the present disclosure provides a hot press-formed member having excellent crack propagation resistance and ductility, comprising a base steel sheet and a zinc or zinc alloy plating layer on at least one surface of the base steel sheet, wherein the base steel sheet comprises, by wt %, carbon (C): 0.08-0.30%, silicon (Si): 0.01-2.0%, manganese (Mn): 3.1-8.0%, aluminum (Al): 0.001-0.5%, phosphorus (P): 0.001-0.05%, sulfur (S): 0.0001-0.02%, nitrogen (N): 0.02% or less, and a balance of Fe and other impurities, wherein the hot press-formed member comprises 1-30 area % of retained austenite as a microstructure, and a Mn(wt %)/Zn(wt %) content ratio in an oxide layer of 0.5-1.2 μm in a thickness direction from the surface layer of the plating layer is 0.1 or more.

Another aspect of the present disclosure provides a method for producing a hot press-formed member having excellent crack propagation resistance and ductility, the method comprising: an operation of preparing a base steel sheet having the above-described composition and zinc- or zinc alloy-plating the base steel sheet to produce a coated steel sheet; an operation of introducing the coated steel sheet in a heating furnace, heating the coated steel sheet at a heating rate of 1-1,000° C./s to a Ac3 temperature or higher, and maintaining the coated steel sheet for 5-10,000 seconds; an operation of extracting the heated and maintained coated steel sheet from the heating surface, cooling the coated steel sheet at an average cooling rate of less than 50° C./s to a temperature of 400-650° C., and hot forming the coated steel sheet at the temperature; and an operation of cooling the coated steel sheet, after the hot forming, to a temperature of 100° C. or less at a rate of 1° C./s or more to produce a hot press-formed member, wherein when heating the coated steel sheet, a maximum heating temperature is within the range of more than Ac3+10° C. to less than Ac3+200° C., and after the cooling to a temperature of 100° C. or less, a microstructure including 1-20 area % of retained austenite, and at least one of martensite and bainite as remaining is formed.

Advantageous Effects

According to the present disclosure, a hot press-formed member having excellent ductility and crack propagation resistance while having a tensile strength of 1,300 MPa or more, may be provided.

In addition, the hot press-formed member of the present disclosure may be suitably used for automotive structural members or reinforcing materials that require corrosion resistance and crashworthiness.

BEST MODE FOR INVENTION

In manufacturing a hot press-formed member using a coated steel sheet, the present inventors have investigated on improving ductility and crack propagation resistance, as well as strength, of the hot press-formed member.

As a result, the present inventors have confirmed that when heating and hot forming temperatures, post-heating process conditions, and the like, are optimized, a hot press-formed member having desired properties may be provided.

In a conventional hot forming method using a zinc or zinc alloy plating material, the plated material is heated at a high temperature and formed at the high temperature, and when heating at the high temperature, a large quantity of soft zinc oxides are formed on the surface of the plated material, which generate microcracks when forming, so fatigue properties and bending properties of the hot press-formed member deteriorate. In addition, coarse-grained prior austenite may be formed, and it may be difficult to achieve sufficient retained austenite as a microstructure of a final hot press-formed member, so the hot press-formed member thus produced may be unsuitable for use as crashworthy and impact-absorbing members.

In light of the above, when manufacturing a hot press-formed member using a zinc or zinc alloy plating material, in the present disclosure, a content of manganese (Mn) in the plated material is increased, so when heating to a high temperature for hot forming, hard manganese oxides may be formed on the surface relatively more than zinc oxides, resulting in an increased number of microcracks on a wall part of the plating layer (for example, the observed surface shown in FIG. 1), the part to which shear deformation is applied when forming, thus distributing shear deformation stress. In addition, by having a hot forming temperature in a lower temperature region than in the conventional method, the present disclosure may improve microcrack propagation resistance. In addition, the present disclosure may reduce a prior austenite grain size and ensure a sufficient retained austenite phase to improve crashworthy properties. In addition, through a post-heat treatment process (referring to a tempering process in the present disclosure), the present disclosure may further stabilize the retained austenite phase, further improve yield strength, and further improve crashworthiness by reducing dislocation density within martensite.

Hereinbelow, the present disclosure will be more fully described in detail.

An aspect of the present disclosure provides a hot press-formed member having excellent crack propagation resistance and ductility, comprising a base steel sheet and a zinc or zinc alloy plating layer on at least one surface of the base steel sheet.

The base steel sheet may be a hot-rolled steel sheet or cold-rolled steel sheet containing a certain percentage of manganese (Mn), and more particularly, the base steel sheet preferably contains, by wt %, carbon (C): 0.08 to 0.30%, silicon (Si): 0.01 to 2.0%, manganese (Mn): 3.1-8.0%, aluminum (Al): 0.001-0.5%, phosphorus (P): 0.001-0.05%, sulfur (S): 0.0001-0.02%, and nitrogen (N): 0.02% or less.

Hereinbelow, reasons for limiting the alloy composition of the base steel sheet will be described in detail, and the content of each component is provided in wt % unless otherwise specified.

C: 0.08 to 0.30%

Carbon (C) is an essential element for improving the strength of a hot press-formed member, and in the present disclosure, is useful for securing retained austenite that needs to be formed to achieve excellent ductility, and therefore, should be added in a proper amount.

If the content of carbon (C) is less than 0.08%, it may be difficult to achieve sufficient strength and ductility, so it may be preferable that carbon (C) be added in an amount of 0.08% or more. However, if the content of carbon (C) exceeds 0.30%, the cold rolling property of a hot-rolled steel sheet may be markedly lowered in a cold rolling process because the strength of the hot-rolled steel sheet may be too high, and spot weldability may be markedly lowered as well.

Accordingly, in the present disclosure, it may be preferable that the content of carbon (C) be limited to 0.08-0.30%.

Si: 0.01 to 2.0%

Silicon (Si) is added to remove oxygen in a steel making process, suppress the formation of carbides, which markedly affects the strength of a hot press-formed member, and is an element useful for securing retained austenite by concentrating carbon (C) along grain boundaries of lath martensite after martensite is formed when hot forming.

If the content of silicon (Si) is less than 0.01%, the above-described effects may not be achieved, and it may be difficult to achieve a high degree of cleanliness of steel, moreover, controlling the content of silicon (Si) may be costly. Meanwhile, the content of silicon (Si) exceeding 2.0% may markedly lower coatability when plating with zinc or a zinc alloy, and thus may not be preferable.

Accordingly, in the present disclosure, it may be preferable that the content of silicon (Si) be limited to 0.01-2.0%. It may be more preferable that silicon (Si) be added in an amount of 1.5% or less, and even more preferable that silicon (Si) be added in an amount of 0.7% or less.

Mn: 3.1-8.0%

Manganese (Mn) is an extremely important element in the present disclosure. Manganese (Mn) serves to provide solid solution strengthening effects, serves to lower an Ac3 temperature (the temperature at which 100% transformation to austenite takes place during heating), and serves to lower an Ms temperature (the temperature at which martensitic transformation begins). Particularly, in the present disclosure, the hot forming is performed in relatively low temperature regions, and when the heated material, after being extracted from the heating furnace, is cooled to a temperature for the hot forming, the manganese (Mn) suppresses the formation of ferrite which causes degradations in strength, and therefore, needs to be added in a sufficient amount.

If the content of manganese (Mn) is less than 3.1%, the above-described effects may not be sufficiently achieved, and if the content of manganese (Mn) exceeds 8.0%, the strength of the steel sheet before performing the hot forming becomes excessively high, thus degrading workability, and even when the temperature of the material is increased, hot forming properties may deteriorate, and the manufacturing costs of alloy components may be increased, thus lowering manufacturing competitiveness.

Accordingly, in the present disclosure, it may be preferable that the content of manganese (Mn) be limited to 3.1-8.0%, and more preferably, to 3.5-8.0%.

Al: 0.001-0.5%

Aluminum (Al) is an element effective in removing oxygen in a steel making process, along with the silicon (Si), to increase a degree of cleanliness of steel.

If the content of aluminum (Al) is less than 0.001%, the above-described effect may be difficult to achieve, and if the content of aluminum (Al) exceeds 0.5%, the Ac3 temperature may be excessively elevated, so that a heating temperature for the hot forming may need to be increased even further.

Accordingly, in the present disclosure, it may be preferable that the content of aluminum (Al) be limited to 0.001-0.5%.

P: 0.001-0.05%

Phosphorus (P) exists as an impurity in steel, and high manufacturing costs may be incurred to keep the content of phosphorus (P) less than 0.001%, whereas a content of phosphorus (P) exceeding 0.05% may markedly decrease the weldability of a hot press-formed member, and thus may not be preferable.

Accordingly, in the present disclosure, it may be preferable that the content of phosphorus (P) be limited to 0.001-0.05%, and more preferably, to 0.02% or less.

S: 0.0001-0.02%

Sulfur (S) exists as an impurity in steel, and is an element negatively affecting the ductility, impact properties, and weldability of a hot press-formed member, and thus, it may be preferable that the content of sulfur (S) be limited to 0.02% or less. However, manufacturing costs may markedly increase to keep the content of sulfur (S) less than 0.0001%, so it may be preferable that a lower limit of the content of sulfur (S) be limited to 0.0001%.

Accordingly, in the present disclosure, it may be preferable that the content of sulfur (S) be limited to 0.0001-0.02%, and more preferably, to 0.01% or less.

N: 0.02% or less

Nitrogen (N) is an element contained as an impurity in steel, and if the content of nitrogen (N) exceeds 0.02%, a slab may become prone to cracking during continuous casting, and impact properties may deteriorate as well.

Accordingly, in the present disclosure, it may be preferable that the content of nitrogen (N) be limited to 0.02% or less. However, manufacturing costs may drastically increase for keeping the content of nitrogen (N) less than 0.0001%, so it may be preferable that a lower limit of the content of nitrogen (N) be limited to 0.0001%.

The base steel sheet of the present disclosure, in addition to the above-described alloy composition, may further contain the following elements, which will be described below. Particularly, the base steel sheet may further contain, preferably, at least one group selected from the following groups (1) to (4), and reasons for limiting the alloy composition of each group will be fully described in detail hereinbelow.

(1) At least one of chromium (Cr) and molybdenum (Mo), a total content thereof being 0.001-2.0%.
(2) At least one among titanium (Ti), niobium (Nb), and vanadium (V), a total content thereof being 0.001-0.2%.
(3) At least one of copper (Cu) and nickel (Ni), a total content thereof being 0.005-2.0%.
(4) Boron (B): 0.0001-0.01%.

The total content of at least one of chromium (Cr) and molybdenum (Mo): 0.001-2.0%

Chromium (Cr) and molybdenum (Mo) are elements useful for achieving strength and grain refinement through improving hardenability and precipitation strengthening effects. If the total content of at least one of chromium (Cr) and molybdenum (Mo) is less than 0.001%, the above-described effects may not be achieved, however, the total content thereof exceeding 2.0% may saturate these effects, and also cause weldability to deteriorate and manufacturing costs to increase, and thus may not be preferable.

Accordingly, in the present disclosure, it may be preferable to limit the total content of at least one of chromium (Cr) and molybdenum (Mo) added, to 0.001-2.0%.

The total content of at least one among titanium (Ti), niobium (Nb), and vanadium (V): 0.001-0.2%

Titanium (Ti), niobium (Nb), and vanadium (V) have the effect of improving the strength of a hot press-formed member by forming fine precipitates, as well as the effect of stabilizing retained austenite and improving impact toughness by inducing grain refinement. If the total content of at least one among titanium (Ti), niobium (Nb), and vanadium (V) is less than 0.001%, the above-described effects may be difficult to achieve; however, a total content thereof exceeding 0.2% may saturate these effects, and incur an increase in the cost for ferro-alloys, and thus may not be preferable.

Accordingly, in the present disclosure, it may be preferable to limit the total content of at least one among titanium (Ti), niobium (Nb), and vanadium (V) to 0.001-0.2%.

The total content of at least one of copper (Cu) and nickel (Ni): 0.005-2.0%

Copper (Cu) may be added as an element improving strength by forming fine precipitates, and nickel (Ni) may be optionally added, as needed, since hot brittleness may be caused when copper (Cu) is added alone. If the total content of at least one of copper (Cu) and nickel (Ni) is less than 0.005%, the above-described effects may be difficult to achieve, however, the total content thereof exceeding 2.0% may incur an excessive increase in the cost.

Accordingly, in the present disclosure, it may be preferable to limit the total content of at least one of copper (Cu) and nickel (Ni) added to 0.005-2.0%.

Boron (B): 0.0001-0.01%

The addition of even a small amount of boron (B) may improve hardenability, and boron (B) segregates along prior-austenite grain boundaries to suppress embrittlement of a hot press-formed member caused by phosphorus (P) and/or sulfur (S) segregating along grain boundaries. If the content of boron (B) is less than 0.0001%, the above-described effects may be difficult to achieve; however, the content of boron (B) exceeding 0.01% may saturate these effects, causing brittleness when hot rolling.

Accordingly, in the present disclosure, it may be preferable to limit the content of boron (B) added to 0.0001-0.01%, and more preferably, to 0.005% or less.

Other than the above-described alloy components, the remainder component is iron (Fe). However, since in a conventional manufacturing process, inevitable impurities may be introduced from raw materials or surrounding environments, these impurities should not be excluded. Since these impurities are well known to anyone skilled in the conventional manufacturing process, they will not be described in the present description.

The hot press-formed member of the present disclosure comprises a plating layer on at least one surface of a base steel sheet having the above-described composition, wherein the plating layer is a zinc or zinc alloy plating layer, and may be, for example, a zinc (Zn)-plated layer, a zinc (Zn)-iron (Fe) plated layer, a zinc (Zn)-aluminum (Al) alloy plated layer, or a zinc (Zn)-aluminum (Al)-magnesium (Mg) alloy plated layer. However, the plating layer is not limited thereto.

The hot press-formed member of the present disclosure may preferably comprise 1-30 area % of retained austenite in microstructures thereof.

If a phase fraction of the retained austenite is less than 1%, a desired level of ductility may not be achieved. However, the phase fraction of retained austenite exceeding 30% may guarantee excellent ductility, however, this may require carbon (C) or manganese (Mn) to be added in larger amounts, significantly degrading the spot weldability and impact properties of a hot press-formed member, and thus may not be preferable.

Meanwhile, the phase fraction of retained austenite, as will be described below, may be controlled through hot forming conditions, and when hot forming and the subsequent cooling are performed in the conditions proposed in the present disclosure, 1-20 area % of retained austenite phase may be formed, and when a tempering process after the cooling is further performed, 1-30 area % of retained austenite phase may be guaranteed.

The phase fraction of retained austenite may be derived by calculating the area under an austenite peak, through an X-ray diffraction test.

The remaining part other than the remained austenite phase may be preferably at least one of martensite and bainite, or at least one of tempered martensite and bainite.

In addition, the hot press-formed member of the present disclosure has preferably a prior austenite grain size (PAGS) of 10 μm or less. If the PAGS exceeds 10 μm, the amount of impurities per unit area, such as P or S segregating along grain boundaries, increases during a heat treatment, and microcrack propagation may be difficult to suppress, so crashworthy characteristics may deteriorate.

Accordingly, it may be preferable that the PAGS be 10 μm or less, more preferably, 7 μm or less, and even more preferably, 5 μm or less.

The smaller the PAGS, the smaller the amount of impurities segregating along grain boundaries, and the easier it is to suppress the propagation of microcracks, however, manufacturing costs may markedly increase for keeping the PAGS under 0.1 μm, and thus, it may be preferable to limit the lower limit thereof to 0.1 μm.

Further, in the hot press-formed member of the present disclosure, it may be preferable that a ratio of manganese to zinc (Mn (wt %)/Zn (wt %)) in an oxide layer of 0.5-1.2 μm in a thickness direction from the surface layer of a plating layer be 0.1 or more.

As described above, by increasing the amount of manganese oxides in the oxide layer in a surface layer region of the plating layer, it is possible to effectively suppress the generation of microcracks in a side surface portion (for example, the observed surface shown in FIG. 1) which mainly receives the effects of shear transformation during hot forming.

An upper limit of the ratio of manganese to zinc (Mn/Zn) in the oxide layer is not limited to any particular value, however, for the upper limit to exceed 2.0, the content of manganese (Mn) needs to exceed 8%, in which case manufacturing costs may increase and operationality may suffer. Accordingly, it may be preferable to limit the upper limit of the ratio of manganese to zinc to 2.0.

Hereinbelow, a method for producing a hot press-formed member, another aspect of the present disclosure, will be described in detail.

First, it may be preferable to prepare a base steel sheet containing the above-described alloy composition and then, to plate the base steel sheet with zinc or a zinc alloy to produce a coated steel sheet.

The base steel sheet, as described above, may be a hot-rolled steel sheet or a cold-rolled steel sheet, and may be produced by the method described below.

The hot-rolled steel sheet may preferably be produced by re-heating a steel slab having the above-described alloy components, and subjecting the steel slab to a finish hot-rolling process and a coiling process.

For example, it may be preferable that in the re-heating process, the steel slab be heated to a heating temperature of 1,000-1,300° C. If the heating temperature is less than 1,000° C., it may be difficult to homogenize the structure and composition of the slab, however, the heating temperature exceeding 1,300° C. may give rise to excessive oxidation and equipment degradation, and thus, may not be preferable.

Subsequently, the reheated slab may be finish hot rolled to produce a hot-rolled steel sheet. The finish hot rolling may be performed preferably at a temperature of Ar3 to 1,000° C., and if the finish hot rolling temperature is Ar3 or less, the rolling may occur in a two-phase region, and thus, it may be difficult to control the structure of surface mixed grains and the shape of a steel sheet. If the finish hot rolling temperature exceeds 1,000° C., the grains of the hot-rolled material may become coarse.

Subsequently, the hot-rolled steel sheet produced above may be coiled into the shape of a coil, preferably at a temperature of 750° C. or less while exceeding Ms. If the coiling temperature is Ms or less, the strength of the hot-rolled material may become excessively high, thus increasing the load for subsequently performed cold rolling. If the coiling temperature exceeds 750° C., the oxidation of grain boundaries of the hot-rolled material may be excessive, thereby causing pickling properties to deteriorate.

The cold-rolled steel sheet may be produced, preferably by pickling, cold rolling, and annealing the hot-rolled steel sheet produced above.

At this point, the cold rolling is to manufacture a cold-rolled steel sheet having a desired thickness, and may be preferably performed at a reduction ratio of 10-80%.

The cold-rolled steel sheet obtained above may be preferably annealed in a continuous annealing furnace to lower the strength thereof. The strength of the steel sheet may be effectively lowered by performing continuous annealing at a temperature of 600-900° C. for 1-1000 seconds.

Also, the hot-rolled steel sheet before or after performing the pickling treatment, prior to performing the cold rolling, may be subjected to a batch annealing process. This is to lower the strength of the hot-rolled material, and may preferably be performed at a temperature of 400-700° C. for 1-100 hours, in particular.

It may be preferable that the hot-rolled steel sheet or cold-rolled steel sheet produced as described above be subjected to a plating process to produce a coated steel sheet.

The plating process is not limited to any particular process, but may be zinc or zinc alloy plating. In particular, when the base steel sheet is a hot-rolled steel sheet, hot dip zinc plating, hot dip zinc alloy plating, or electrical zinc plating may all be applicable. However, when the base steel sheet is a cold-rolled steel sheet, it may be preferable that electrical zinc plating be performed. For example, the hot dip zinc alloy plating may be zinc-aluminum alloy plating, zinc-aluminum-manganese alloy plating, or the like. Such plating processes may be performed to their respective conventional conditions, so such conditions are not limited to particular conditions.

Further, prior to the plating process, metal coating with iron (Fe), nickel (Ni), or the like may be performed for the purpose of improving plating adhesion.

As described above, the coated steel sheet obtained according to an embodiment of the present disclosure may be hot formed to produce a hot press-formed member.

First, it may be preferable that the coated steel sheet be heated to and maintained at a temperature equal to or greater than a certain temperature. For example, it may be preferable that the coated steel sheet be introduced in a heating furnace and heated to a temperature equal to or greater than Ac3, which is equal to or greater than a single phase of austenite, at a heating rate of 1-1,000° C./s, and be maintained for 5-10,000 seconds.

More preferably, when heating at the above-described heating rate, a maximum heating temperature is preferably within a temperature range from more than Ac3+10° C. to less than Ac3+200° C. When the maximum heating temperature is Ac3+10° C. or less, even if heated to a temperature equal to or greater than Ac3, local regions may exist where carbon (C) and/or manganese (Mn) are not segregated, thus, complete transformation to austenite may not take place, causing prior-ferrite to remain, and thus, yield strength may not be sufficiently improved. In addition, springback of the hot press-formed member may be excessive, making it difficult to achieve shape fixability. However, when the maximum heating temperature is Ac3+200° C. or more, it may be easy to achieve sufficient strength and shape fixability, but spot weldability may deteriorate due to an excessive formation of oxides on the surface of the plating layer.

Accordingly, it may be preferable that the coated steel sheet be maintained in the above-described temperature regions, however, if the maintaining time is less than 5 seconds, complete austenization may not take place, and also, it may be difficult to achieve a Mn/Zn content ratio of 0.1 or more in surface oxides. The maintaining time exceeding 10,000 seconds may reduce spot weldability due to an excessive formation of oxides on the surface.

It may be preferable that the coated steel sheet, heated and maintained as described above, after being extracted from the heating furnace, be cooled to a hot forming temperature. At this point, it may be preferable that a cooling rate be controlled to be less than 50° C./s, since in order to keep the cooling rate to be 50° C./s or more, separate cooling equipment may be required, undesirably incurring an increase in manufacturing costs. Therefore, it may be more preferable that the cooling be performed at a cooling rate less than 30° C./s, and even more preferably, at a cooling rate less than 15° C./s.

The cooling rate less than 1° C./s may cause ferrite to be formed during the cooling, thus undesirably lowering the strength of the hot press-formed member. Accordingly, when performing the cooling, it may be preferable that a lower limit of the cooling rate be limited to 1° C./s.

It may be preferable that hot forming be performed once the cooling is completed as described above. In the present disclosure, in order to improve microcrack formation and crack propagation resistance, the hot forming temperature is controlled to 400-650° C.

Conventionally, it is preferable to increase the hot forming temperature as much as possible in order to improve processability and reduce a press load. However, when a zinc or zinc alloy plating steel sheet is thermally treated at a high temperature, zinc may be dispersed and introduced into grain boundaries, thus lowering the strength of grain boundaries of the base iron, and consequently, this may undesirably facilitate microcrack formation and crack propagation in the hot press-formed member.

In light of the above, in the present disclosure, it may be preferable that the hot forming be performed at a temperature of 650° C. or less, and not at conventional temperatures. When the hot forming temperature is 650° C. or less, although it may vary depending on the heating temperature, the composition of the base iron, or the like, the strength of grain boundaries may become greater than the strength of the base iron, thus, it may be possible to improve microcrack formation and propagation resistance in the hot press-formed member. However, if the hot forming temperature is too low, below 400° C., martensitic or bainitic transformation may occur prior to hot forming, causing hot forming properties to deteriorate.

Accordingly, in the present disclosure, it may be preferable that the hot forming be performed at a temperature of 400-650° C.

Immediately after performing the hot forming in the above-described temperature ranges, it may be preferable that cooling be performed to a temperature of 100° C. or less at a cooling rate of 1° C./s or more, to produce a final hot press-formed member.

At this point, when the cooling rate is less than ° C./s, ferrite may be formed as a final microstructure, making it undesirably difficult to achieve ultra-high strength.

Conventionally, in case of 22MnB5 steel, the critical cooling rate is 25° C./s or higher; however, in the present disclosure, manganese (Mn), a component of the steel composition, is added in an amount of 3.1% or more, so even at a slow cooling rate of 1° C./s higher, ferrite may not be formed. However, with regard to productivity, the cooling may preferably be performed at a cooling rate of 5° C./s or higher, and more preferably, at a cooling rate of 10° C./s or higher. The upper limit of the cooling rate is not limited to any particular value; however, with regard to equipment costs, it is preferable to limit the upper limit of the cooling rate to 1,000° C./s.

Once the cooling is completed, a hot press-formed member comprising 1-20 area % of retained austenite, and remaining at least one of martensite and bainite, as a microstructure, may be obtained.

In addition, a tempering step of heating the hot press-formed member cooled as described above to a temperature of 150-600° C. and maintaining the hot press-formed member for 1-100,000 seconds may be further comprised. This is to increase the stability of retained austenite, a microstructure of the hot press-formed member. When the cooling is completed after such a tempering treatment is performed, a hot press-formed member comprising 1-30 area % of retained austenite, and remaining at least one of tempered martensite and bainite, as a microstructure, may be obtained.

When the tempering temperature is less than 150° C. or the maintaining time is less than one second, it may be undesirably difficult to achieve a sufficient stability of retained austenite phase. When the tempering temperature exceeds 600° C., the strength of the hot press-formed member may be markedly lowered, and the prior austenite grain size may grow to be coarse, thus lowering impact toughness and causing heat-induced deformation, and consequently, lowering precision in the shape of a member. Alternatively, the maintaining time exceeding 100,000 seconds may markedly reduce the strength of the hot press-formed member and may consume time excessively, thus undesirably reducing the productivity of the member.

Hereinbelow, the present disclosure will be more fully described with reference to specific embodiments. However, it should be understood that the following embodiments are only examples and therefore, should not be used as an aid in determining the scope of the present disclosure, since the scope of the invention is determined by appended claims and reasonable equivalents thereof.

MODE FOR INVENTION

Embodiment

A 40 mm-thick ingot, having the alloy composition shown in Table 1, was melted under vacuum and heated for one hour in a heating furnace at 1,200° C., and thereafter, was finish hot rolled at 900° C. and coiled at 680° C. to produce hot rolled steel sheets having a final thickness of 3 mm, wherein the furnace cooling temperature was 680° C.

Next, the hot-rolled steel sheets were pickled and cold-rolled at a cold reduction rate of 50% to produce cold-rolled steel sheets. Only when the hot-rolled steel sheet had a tensile strength of 1,500 MPa or greater, batch annealing was performed prior to the cold rolling. The batch annealing was performed by heating to 600° C. at a rate of 30° C./hour, maintaining for 10 hours, and cooling to room temperature at a cooling rate of 30° C./hour. Thereafter, the cold-rolled steel sheets were continuously annealed at 780° C., and were subjected to hot-dip galvanization (GI) or galvannealing (GA) to produce coated steel sheets. Some of the cold-rolled steel sheets were subjected to electrogalvanization (EG) to produce coated steel sheets. The GI, the GA, and the EG were performed under respective conventional conditions.

Figure 1:
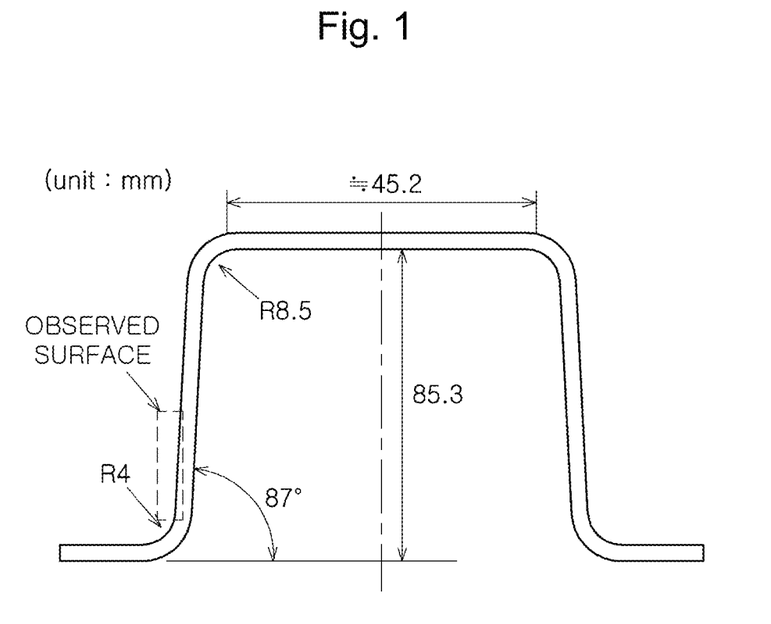
FIG. 1 is a cross-sectional view of a hat-shaped hot press-formed member according to an embodiment of the present disclosure.

The coated steel sheets produced above were each produced as a hat-shaped hot pressed formed member as shown in FIG. 1. The coated steel sheets were introduced into a heating furnace maintained under air atmosphere, and were heated to a maximum target temperature and maintained for a target time, and then extracted from the heating furnace. Subsequently, the coated steel sheets were cooled to a hot forming temperature, and then hot formed and rapid cooled at the hot forming temperature to produce hat-shaped hot press-formed members. The conditions for the heating, cooling, and hot forming are shown in Table 2.

Tensile testing, microstructure observation, and XRD and GDS analyses were performed using respective hot press-formed member specimens. The tensile testing was performed at a testing rate of 10 mm/min using a JIS 5 test piece, and phase fractions of microstructures were calculated from the following equation using the integrated intensities of retained austenite peaks ($\gamma$) and martensite peaks obtained from the Cu target X-ray diffraction analysis, and the results are shown in Table 2.

$$V_\gamma (\%) = \frac{\left[\frac{1}{2.429\left(\frac{1\alpha^{200}}{1\gamma^{200}}\right)+1}\right]+\left[\frac{1}{1.279\left(\frac{1\alpha^{200}}{1\gamma^{220}}\right)+1}\right]+\left[\frac{1}{1.464\left(\frac{1\alpha^{200}}{1\gamma^{311}}\right)+1}\right]+\left[\frac{1}{1.328\left(\frac{1\alpha^{211}}{1\gamma^{200}}\right)+1}\right]+\left[\frac{1}{0.699\left(\frac{1\alpha^{211}}{1\gamma^{220}}\right)+1}\right]+\left[\frac{1}{0.801\left(\frac{1\alpha^{211}}{1\gamma^{311}}\right)+1}\right]}{6} \times 100$$

After prior austenite grain boundaries were exposed by an etching method using hydrofluoric acid, a prior austenite grain size (PAGS) was calculated as an average value of average grain sizes measured at 5 different points at a ¼ point of thickness of each base iron by using an image analyzing program, and the results are shown in Table 2.

In addition, a cross-section of the plating layer at R=4-30 mm from the lower end of a curved surface of the hat-shaped hot press-formed member was observed using an optical microscope, and a maximum crack depth penetrating a base iron from a boundary between the base iron and the plating layer was measured through an optical image analysis. As requested by the client, the specimens with a maximum crack depth exceeding 10 μm were determined to be unacceptable. To measure a Mn/Zn content ratio in surface oxides, an average Mn/Zn content ratio value was obtained from 1 μm point from each surface layer by using a glow discharge spectrometer (GDS), and the results are shown in Table 2.

Some of the hat-shaped hot press-formed members were introduced in a heating furnace preheated to a target temperature, and were tempered and air-cooled. The tempering conditions were as shown in Table 3.

As described above, mechanical properties and microstructure phase fractions (retained austenite) were measured by performing tensile testing and XRD analyses in the same manner as the above, using the tempered hot press-formed member specimens, and the results are shown in Table 3.

TABLE 1

| | Alloy Composition (wt %) | | | | | | | | | |
|---|---|---|---|---|---|---|---|---|---|---|
| Steel | C | Si | Mn | P | S | Al | N | B | Others | Notes |
| A | 0.18 | 0.20 | 3.8 | 0.015 | 0.0030 | 0.03 | 0.0033 | 0 | 0 | Inventive Steel |
| B | 0.15 | 0.14 | 5.0 | 0.014 | 0.0025 | 0.03 | 0.0042 | 0 | Ti: 0.03 | Inventive Steel |
| C | 0.21 | 1.52 | 5.9 | 0.007 | 0.0011 | 0.02 | 0.0050 | 0.0035 | Ti: 0.04 | Inventive Steel |
| D | 0.20 | 0.15 | 6.7 | 0.009 | 0.0030 | 0.03 | 0.0050 | 0.0026 | 0 | Inventive Steel |
| E | 0.25 | 1.51 | 6.8 | 0.007 | 0.0015 | 0.01 | 0.0037 | 0 | Mo: 0.1 | Inventive Steel |
| F | 0.26 | 0.10 | 7.5 | 0.017 | 0.0018 | 0.008 | 0.0062 | 0.0032 | Ti: 0.02 | Inventive Steel |
| G | 0.23 | 0.20 | 1.2 | 0.014 | 0.0024 | 0.03 | 0.0038 | 0.0025 | Ti: 0.03 | Comparative Steel |

TABLE 2

| | | Hot Forming Conditions | | | | Mechanical Properties | | Retained $\gamma$ | | | Maximum | |
|---|---|---|---|---|---|---|---|---|---|---|---|---|
| Steel | Plating | Heating Temperature (° C.) | Maintaining Time (sec) | Cooling Rate (° C./s) | Forming Temperature (° C.) | TS (Mpa) | El (%) | Fraction (%) | PAGS (μm) | Mn/Zn Content Ratio | Crack Depth (μm) | Notes |
| A-1 | GI | 800 | 60 | 10.3 | 620 | 1583 | 7.9 | 3.9 | 6.9 | 0.30 | 7.2 | Inventive Example 1 |
| A-2 | GI | 800 | 60 | 10.1 | 500 | 1547 | 7.2 | 3.3 | 6.8 | 0.32 | 3.5 | Inventive Example 2 |
| A-3 | GI | 800 | 60 | 31.5 | 500 | 1554 | 7.3 | 3.4 | 6.8 | 0.32 | 3.4 | Inventive Example 3 |
| A-4 | GA | 800 | 60 | 10.0 | 450 | 1490 | 8.3 | 3.4 | 6.2 | 0.31 | 0.0 | Inventive Example 4 |

TABLE 2-continued

| | | Hot Forming Conditions | | | | Mechanical Properties | | Retained γ | | Mn/Zn | Maximum Crack | |
| | | Heating | Maintain- | Cooling | Forming | | | | | | | |
| Steel | Plating | Temperature (° C.) | ing Time (sec) | Rate (° C./s) | Temperature (° C.) | TS (Mpa) | El (%) | Fraction (%) | PAGS (μm) | Content Ratio | Depth (μm) | Notes |
|---|---|---|---|---|---|---|---|---|---|---|---|---|
| A-5 | EG | 800 | 60 | 9.7 | 400 | 1465 | 7.6 | 3.8 | 6.3 | 0.34 | 0.2 | Inventive Example 5 |
| A-6 | GI | 800 | 60 | 10.8 | 710 | 1662 | 7.8 | 3.1 | 6.3 | 0.28 | 22.3 | Comparative Example 1 |
| A-7 | GI | 800 | 6 | 10.5 | 690 | 1627 | 8.1 | 3.5 | 6.0 | 0.29 | 17.8 | Comparative Example 2 |
| A-8 | GI | 800 | 1 | 10.6 | 550 | 1592 | 7.8 | 3.5 | 6.2 | 0.09 | 10.6 | Comparative Example 3 |
| B-1 | GA | 800 | 60 | 10.3 | 500 | 1653 | 9.6 | 4.0 | 4.1 | 0.39 | 0.0 | Inventive Example 6 |
| C-1 | EG | 780 | 120 | 10.5 | 500 | 2035 | 7.9 | 5.7 | 2.8 | 0.52 | 0.0 | Inventive Example 7 |
| D-1 | GI | 780 | 120 | 10.3 | 500 | 2089 | 6.7 | 6.5 | 2.5 | 0.64 | 0.0 | Inventive Example 8 |
| E-1 | EG | 780 | 120 | 10.4 | 500 | 2231 | 6.6 | 7.1 | 2.3 | 0.67 | 0.0 | Inventive Example 9 |
| F-1 | GA | 750 | 60 | 10.2 | 500 | 2407 | 7.3 | 11.3 | 1.8 | 0.72 | 0.0 | Inventive Example 10 |
| G-1 | GI | 930 | 60 | 12.7 | 750 | 1539 | 6.6 | 0.3 | 12.7 | 0.07 | 28.5 | Comparative Example 4 |
| G-2 | GI | 930 | 60 | 11.5 | 550 | 631 | 18.2 | 0.1 | 12.5 | 0.05 | 10.3 | Comparative Example 5 |

(In Table 1, TS represents tensile strength, and El represents elongation. Also, in Table 1, fractions other than the fraction of a retained austenite phase are of one or more types selected from bainite and martensite.)

TABLE 3

| | | Tempering Conditions | | Mechanical Properties | | | Retained γ | |
| Steel | | Temperature (° C.) | Time (sec) | YS (MPa) | TS (MPa) | El (%) | Fraction (%) | Notes |
|---|---|---|---|---|---|---|---|---|
| A-3 | A-3-1 | 170 | 1800 | 1342 | 1581 | 9.4 | 4.3 | Embodiment 11 |
| B-1 | B-1-1 | 170 | 1800 | 1311 | 1564 | 10.4 | 7.1 | Embodiment 12 |
| C-1 | C-1-1 | 200 | 30 | 983 | 1931 | 10.5 | 6.4 | Embodiment 13 |
| | C-1-2 | 300 | 30 | 1260 | 1770 | 11.7 | 8.1 | Embodiment 14 |
| | C-1-3 | 400 | 30 | 1383 | 1572 | 12.9 | 12.8 | Embodiment 15 |
| | C-1-4 | 500 | 30 | 1400 | 1452 | 15.8 | 17.8 | Embodiment 16 |
| D-1 | D-1-1 | 200 | 30 | 989 | 1917 | 10.8 | 6.8 | Embodiment 17 |
| | D-1-2 | 300 | 30 | 1240 | 1730 | 11.2 | 7.5 | Embodiment 18 |
| | D-1-3 | 400 | 30 | 1239 | 1569 | 13.7 | 14.9 | Embodiment 19 |
| | D-1-4 | 500 | 30 | 1231 | 1435 | 15.6 | 17.2 | Embodiment 20 |
| | D-1-5 | 600 | 30 | 1072 | 1279 | 18.4 | 19.8 | Embodiment 21 |
| E-1 | E-1-1 | 200 | 300 | 921 | 2052 | 11.9 | 7.8 | Embodiment 22 |
| | E-1-2 | 300 | 300 | 1147 | 1836 | 13.4 | 13.6 | Embodiment 23 |
| | E-1-3 | 400 | 30 | 1244 | 1671 | 14.9 | 15.6 | Embodiment 24 |
| | E-1-4 | 500 | 30 | 1351 | 1568 | 18.9 | 20.7 | Embodiment 25 |
| F-1 | F-1-1 | 500 | 30 | 1180 | 1423 | 12.6 | 23.9 | Embodiment 26 |
| G-1 | G-1-1 | 200 | 1800 | 1162 | 1482 | 6.9 | 0.3 | Comparative Example 6 |
| | G-1-2 | 250 | 1800 | 1154 | 1425 | 7.1 | 0.4 | Comparative Example 7 |
| | G-1-3 | 300 | 1800 | 1185 | 1351 | 3.1 | 0.5 | Comparative Example 8 |
| | G-1-4 | 400 | 1800 | 1060 | 1162 | 3.1 | 0.6 | Comparative Example 9 |
| | G-1-5 | 500 | 1800 | 842 | 903 | 9.1 | 0.9 | Comparative Example 10 |

(In Table 1, YS represents yield strength, TS represents tensile strength, and El represents elongation. Also, in Table 1, fractions other than the fraction of a retained austenite phase are of one or more types selected from bainite and tempered martensite.)

Steel G in Table 1 has the alloy composition of 22MnB5 steel, and has a low content of manganese (Mn) of 1.2%. Meanwhile, Steels A to F all have a content of manganese (Mn) in the range of 3.1-8.0%, all satisfying the alloy composition of the present disclosure.

As shown in Table 2, Steels A-1 to A-5 are Inventive Examples satisfying the hot press forming conditions proposed in the present disclosure, all of which have a retained austenite phase fraction of 1% or more, a PAGS of 10 μm or less, a Mn/Zn content ratio of 0.1 or more, and a maximum crack depth of 10 μm or less. Also, these Inventive Examples have achieved excellent ductility as well as ultra-high strength.

Steels A-6 and A-7 are the cases with a high hot forming temperature of 710° C., and maximum crack depths exceeding 10 μm were observed even when the retained austenite phase fraction was 1% or more. Steel A-8 is the case with too short a maintaining time after heating, and it failed to achieve a Mn/Zn content ratio of 0.1 or more, thus, the maximum crack depth exceeded 10 μm.

Steels B-1, C-1, D-1, E-1, and F-1 all have satisfied the hot press forming conditions proposed in the present disclosure, and thus, all have a retained austenite phase fraction of 1% or more, a PAGS of 10 μm or less, and a Mn/Zn content ratio of 0.1 or more, and had no observable microcracks. In addition, these Inventive Examples have achieved excellent ductility as well as ultra-high strength.

However, Steel G-1 has, not only an insufficient alloy composition, but also, due to a high hot forming temperature, an insufficiently formed retained austenite phase, a coarse PAGS, and a Mn/Zn content ratio of less than 0.1, and thus, an extremely large maximum crack depth of 28.5 μm was observed. In the case of Steel G-2, although the hot forming temperature satisfied the present disclosure, it had a coarse PAGS and a Mn/Zn content ratio of less than 0.1, and thus, the maximum crack depth exceeded 10 µm, and the tensile strength was 631 MPa, thus failing to achieve ultra-high strength.

Figure 2:
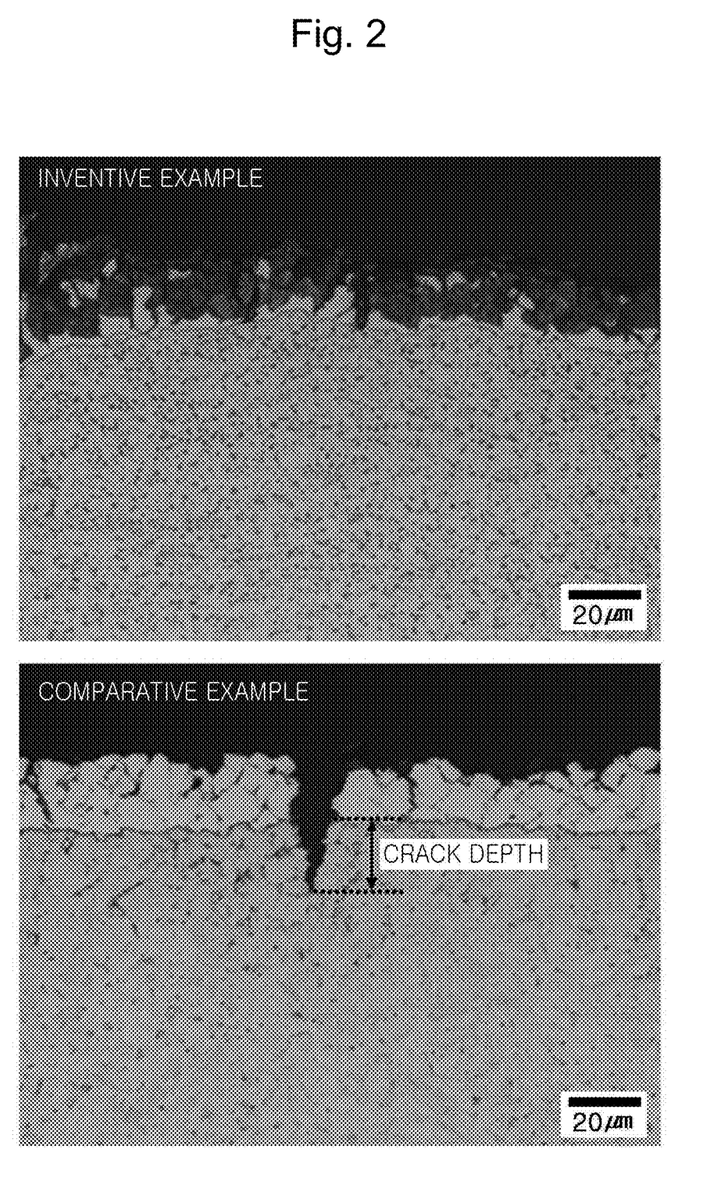
FIG. 2 is photographs of cross-sections of Inventive Example and Comparative Example according to an embodiment of the present disclosure.

FIG. 2 shows microcracks observed in hot press-formed members of Steel B-1 (Inventive Example 6) and Steel A-6 (Comparative Example 1).

Although in Inventive Example 6, a microcrack penetrating the base iron was hardly observed, however, in Comparative Example 1, a crack penetrating the base iron from the plating layer exceeded 10 µm.

As shown in Table 3, tempering was performed on produced hot press-formed members, and in Inventive Examples 11 to 26 (A-1-1 to F-1-1), the retained austenite phase was sufficiently formed after the tempering, and thus, ductility was further improved, and yield strength was high.

However, in Comparative Examples 6 to 9 (G-1-1 to G-1-4), even after the tempering, the retained austenite phase was not sufficiently formed, thus resulting in inferior ductility, and Comparative Example 10 (G-1-5) failed to achieve ultra-high strength.

The invention claimed is:

1. A hot press-formed member comprising:
   a base steel sheet; and
   a zinc or zinc alloy plating layer formed on at least one surface of the base steel sheet,
   wherein the base steel sheet comprises, by wt %, carbon (C): 0.08-0.30%, silicon (Si): 0.01-2.0%, manganese (Mn): 3.1-8.0%, aluminum (Al): 0.001-0.5%, phosphorus (P): 0.001-0.05%, sulfur (S): 0.0001-0.02%, nitrogen (N): 0.02% or less, and a balance of iron (Fe) and other impurities, and
   wherein the hot press-formed member comprises: a microstructure comprising 1-30 area % of retained austenite, and a Mn(wt %)/Zn(wt %) content ratio in an oxide layer of 0.5-1.2 µm in a thickness direction from a surface layer of the plating layer is 0.1 or more.

2. The hot press-formed member of claim 1, wherein the base steel sheet further contains at least one selected from the group consisting of:
   (1) at least one of chromium (Cr) and molybdenum (Mo), a total content thereof being 0.001-2.0%;
   (2) at least one of titanium (Ti), niobium (Nb), and vanadium (V), a total content thereof being 0.001-0.2%;
   (3) at least one of copper (Cu) and nickel (Ni), a total content thereof being 0.005-2.0%; and
   (4) Boron (B): 0.0001-0.01%.

3. The hot press-formed member of claim 1, wherein the microstructure further comprises: at least one of martensite and bainite, or at least one of tempered martensite and bainite.

4. The hot press-formed member of claim 1, wherein the hot press-formed member has a prior austenite grain size of 10 µm or less.

* * * * *